(12) United States Patent
Purohit et al.

(10) Patent No.: US 9,420,518 B2
(45) Date of Patent: Aug. 16, 2016

(54) LAYER-3 MESH CONNECTIVITY OF WIRELESS LOCAL NETWORKS

(71) Applicant: GainSpan Corporation, San Jose, CA (US)

(72) Inventors: Sibasis Purohit, Bangalore (IN); Pankaj Vyas, Bangalore (IN)

(73) Assignee: GAINSPAN CORPORATION, San Jose, CA (US)

(*) Notice: Subject to any disclaimer, the term of this patent is extended or adjusted under 35 U.S.C. 154(b) by 97 days.

(21) Appl. No.: 14/453,634

(22) Filed: Aug. 7, 2014

(65) Prior Publication Data

US 2016/0043942 A1    Feb. 11, 2016

(51) Int. Cl.
*H04L 12/721*    (2013.01)
*H04W 40/24*    (2009.01)
*H04W 84/18*    (2009.01)

(52) U.S. Cl.
CPC ............ *H04W 40/244* (2013.01); *H04W 84/18* (2013.01); *Y02B 60/50* (2013.01)

(58) Field of Classification Search
CPC ....................................................... H04L 45/66
USPC ........................................................ 370/338
See application file for complete search history.

(56) References Cited

U.S. PATENT DOCUMENTS

| | | | |
|---|---|---|---|
| 7,729,285 B2 | 6/2010 | Yoon | |
| 8,392,541 B2 | 3/2013 | Agarwal et al. | |
| 2005/0259595 A1* | 11/2005 | Preguica | H04L 45/16 370/254 |
| 2006/0050742 A1* | 3/2006 | Grandhi | H04W 74/0816 370/506 |
| 2006/0195590 A1* | 8/2006 | Tsubota | H04W 28/06 709/227 |
| 2007/0186105 A1* | 8/2007 | Bailey | H04L 63/0492 713/168 |
| 2008/0304485 A1* | 12/2008 | Sinha | H04L 12/66 370/392 |
| 2009/0116411 A1* | 5/2009 | Castagnoli | H04W 48/16 370/256 |
| 2010/0260146 A1* | 10/2010 | Lu | H04L 12/4633 370/331 |
| 2012/0155463 A1 | 6/2012 | Vasseur et al. | |
| 2013/0010798 A1 | 1/2013 | Shaffer et al. | |
| 2013/0094484 A1* | 4/2013 | Kneckt | H04W 4/02 370/338 |
| 2013/0109313 A1* | 5/2013 | Kneckt | H04W 8/005 455/41.2 |

(Continued)

OTHER PUBLICATIONS

JP Vasseur, Navneet Agarwal, Jonathan Hui, Zach Shelby, Paul Bertrand and Cedric Chauvenet, "RPL: The IP routing protocol designed for low power and lossy networks", Internet Protocol for Smart Objects (IPSO) Alliance, Dated: Apr. 2011, p. 1-20.

(Continued)

*Primary Examiner* — Mark Rinehart
*Assistant Examiner* — Peter Solinsky
(74) *Attorney, Agent, or Firm* — IPHorizons PLLC; Narendra R. Thappeta (57) ABSTRACT

A first wireless device of a wireless local network is operated in an un-associated data transfer mode at a layer-2 level. In the un-associated data transfer mode, communication between the first wireless device and a second wireless device in the wireless local network is allowed to take place without prior authentication and association between the two wireless devices. The first wireless device participates in formulation of routing information in routing nodes of a wireless mesh network while operating in the un-associated data transfer mode. If configured as an end device, the first wireless device thereafter exchanges data packets with another wireless device in the mesh. If configured as a router, the first wireless device routes packets to corresponding wireless devices in the mesh. Operation in the un-associated data transfer mode may result in reduction in power consumption of nodes in the mesh, as well as increased data throughput.

20 Claims, 8 Drawing Sheets

| | To DS | From DS | Address_1 | Address_2 | Address_3 | Address_4 |
|---|---|---|---|---|---|---|
| Row 1 → | 0 | 0 | DA | SA | BSSID | N/A |
| Row 2 → | 0 | 1 | DA | BSSID | SA | N/A |
| Row 3 → | 1 | 0 | BSSID | SA | DA | N/A |
| Row 4 → | 1 | 1 | RA | TA | DA | SA |

595

(56) References Cited

U.S. PATENT DOCUMENTS

| | | | |
|---|---|---|---|
| 2013/0191688 A1 | 7/2013 | Agarwal et al. | |
| 2013/0215751 A1* | 8/2013 | Tetzlaff | H04W 28/065 370/235 |
| 2013/0294436 A1* | 11/2013 | Kim | H04W 16/14 370/338 |
| 2013/0316705 A1* | 11/2013 | Kneckt | H04L 67/16 455/435.1 |
| 2014/0171056 A1* | 6/2014 | Jafarian | H04W 52/0216 455/418 |
| 2015/0222490 A1* | 8/2015 | Salam | H04L 67/2809 709/224 |
| 2015/0350018 A1* | 12/2015 | Hui | H04L 41/0816 370/254 |
| 2016/0007272 A1* | 1/2016 | McCann | H04W 4/001 370/254 |

OTHER PUBLICATIONS

Siarhei Kuryla, "RPL: IPv6 Routing Protocol for Low power and Lossy Networks", Networks and Distributed Systems seminar, Dated: Mar. 1, 2010, pp. 1-19.

Yibo Chen, Jean-Pierre Chanet and Kun Mean Hou, "RPL Routing Protocol a Case Study: Precision Agriculture", First China-France Workshop on Future Computing Technology (CF-WoFUCT 2012), Dated: Feb. 16-17, 2012, pp. 1-6.

Di Wang, Zhifeng Tao, Jinyun Zhang and Alhussein Abouzeid, "RPL Based Routing for Advanced Metering Infrastructure in Smart Grid", Mitsubishi Electric Research Laboratories, Dated: Jul. 2010, p. 1-8.

Mukul Goyal, Emmanuel Baccelli, Matthias Philipp and Inria Saclay "The P2P-RPL Routing Protocol for IPv6 Sensor Networks: Testbed Experiments", 19th International Conference on Software, Telecommunications and Computer Networks, Split : Croatia (2011), Dated: Dec. 14, 2011, pp. 1-6.

"Mesh Routing", https://meraki.cisco.com/technologies/mesh-routing, dated: Downloaded circa: Jan. 31, 2014, pp. 1-2.

"SmartMesh Networking", http://www.ruckuswireless.com/technology/smartmesh, dated: Downloaded circa: Jan. 31, 2014, pp. 1-2.

Ling Song ; Sch. of Comput. & Electron. Inf., Guangxi Univ., Nanning, China ; Xia Zheng-Bing, "An Anycast Routing Protocol for Wireless Mesh Access Network", Information Engineering, 2009. ICIE '09 . WASE International Conference on (vol. 2), Dated: Jul. 10-11, 2009, p. 1.

Dongya Chen ; Phys. & Inf. Eng. Dept., Jining Univ., Qufu, China ; Shoujun Wang ; Jao Tian, "Routing in 802.11 based multi-channel wireless mesh networks", Electronics, Communications and Control (ICECC), 2011 International Conference, dated: Sep. 9-11, 2011, p. 1.

Bogdan Pavkovi'C, Fabrice Theoleyre and Andrzej Duda, "Multipath Opportunistic RPL Routing over IEEE 802.15.4", Miami, Florida, USA, dated: Oct. 31-Nov. 4, 2011, pp. 1-8.

T. Winter Ed, P. Thubert Ed, A. Brandt, J. Hui, R. Kelsey, P. Levis, K. Pister, R. Struik, JP. Vasseur and R. Alexander, "RPL: IPv6 Routing Protocol for Low-Power and Lossy Networks", RFC 6550 , dated: Mar. 2012, pp. 1-157.

* cited by examiner

| Destination IP Address | Next Hop MAC Address |
|---|---|
| IP 121 | MAC 120 |
| IP 122 | MAC 120 |
| IP 123 | MAC 120 |
| IP 111 | MAC 120 |
| IP 112 | MAC 120 |
| IP 115 | MAC 120 |
| IP 151 | MAC 120 |
| IP 152 | MAC 120 |
| IP 131 | MAC 130 |
| IP 132 | MAC 130 |
| IP 141 | MAC 141 |
| IP 118 | MAC 120 |

*FIG. 3A*

| Destination IP Address | Next Hop MAC Address |
|---|---|
| IP 121 | MAC 121 |
| IP 122 | MAC 122 |
| IP 123 | MAC 123 |
| IP 111 | MAC 110 |
| IP 112 | MAC 110 |
| IP 115 | MAC 110 |
| IP 151 | MAC 150 |
| IP 152 | MAC 150 |
| IP 131 | MAC 140 |
| IP 132 | MAC 140 |
| IP 141 | MAC 140 |
| IP 118 | MAC 110 |

LAYER-3 MESH CONNECTIVITY OF WIRELESS LOCAL NETWORKS

BACKGROUND

1. Technical Field

Embodiments of the present disclosure relate generally to wireless local networks, and more specifically to layer-3 mesh connectivity in such networks.

2. Related Art

A wireless local network generally refers to a network in which end devices communicate with each other in a short distance (typically of the order of tens of meters) using wireless medium. Many wireless local networks are implemented in conformity with IEEE 802.11 family of standards, and the wireless local networks are referred to as WLANs (wireless local area network), as is well known in the relevant arts. A WLAN is characterized by end devices, each of which is within communication range with an access point (AP). An end device of a WLAN may rely on an AP for communication with other devices in the WLAN.

The term "connectivity" in networks generally refers to the ability to transfer packets from one end device (source) to another (destination), thereby enabling communication between the source and destination end devices. Within a WLAN, connectivity is typically established at layer 2—MAC (Medium Access Control) layer, with source and destination addresses being specified by the source and destination MAC address fields of a packet.

Mesh connectivity on the other hand implies connectivity with end devices of other WLANs, possibly with room for redundant paths which can be used in case of failure of an otherwise used path. In one common scenario, a source wireless station (originator) first sends a packet to a first AP, which in turn forwards the packet to a second AP. The second AP then delivers the packet to a locally associated destination wireless station, though multiple APs (of respective WLAN networks) can be in the path before a packet is delivered to the destination station.

Layer-3 level protocols are often used for providing connectivity between devices. Internet protocol (IP) is an example of a layer-3 protocol, and the addressing structure provided by such a protocol is thereafter used for specifying a destination wireless station. The addresses are thereafter used for determining the next hop in any aggregators (routers) in the path until the packet is delivered to the destination node.

Aspects of the present disclosure are directed to layer-3 mesh connectivity in wireless local networks.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present disclosure, a first wireless device of a wireless local network is operated in an un-associated data transfer mode at a layer-2 level. In the un-associated data transfer mode, communication between the first wireless device and a second wireless device in the wireless local network is allowed to take place without prior association between the two wireless devices. The first wireless device participates in formulation of routing information in routing nodes of a wireless mesh network formed according to the RPL protocol while operating in the un-associated data transfer mode.

If configured as an end device, the first wireless device thereafter exchanges data packets with another wireless device in the wireless mesh network, while continuing to operate in the un-associated data transfer mode. If configured as a router, the first wireless device routes packets to corresponding wireless devices in the wireless mesh network, while continuing to operate in the un-associated data transfer mode. Operation in the un-associated data transfer mode may result in reduction in power consumption of nodes (due to the transmission of fewer packets) in the mesh, as well as increased data throughput.

According to another aspect of the present disclosure, if configured as a router, the first wireless device may be designed to operate simultaneously in conventional AP mode as well as in un-associated data transfer mode to enable conventional wireless stations to join the wireless mesh network. The conventional wireless stations associate with the router/AP prior to exchanging IP packets with other wireless devices.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
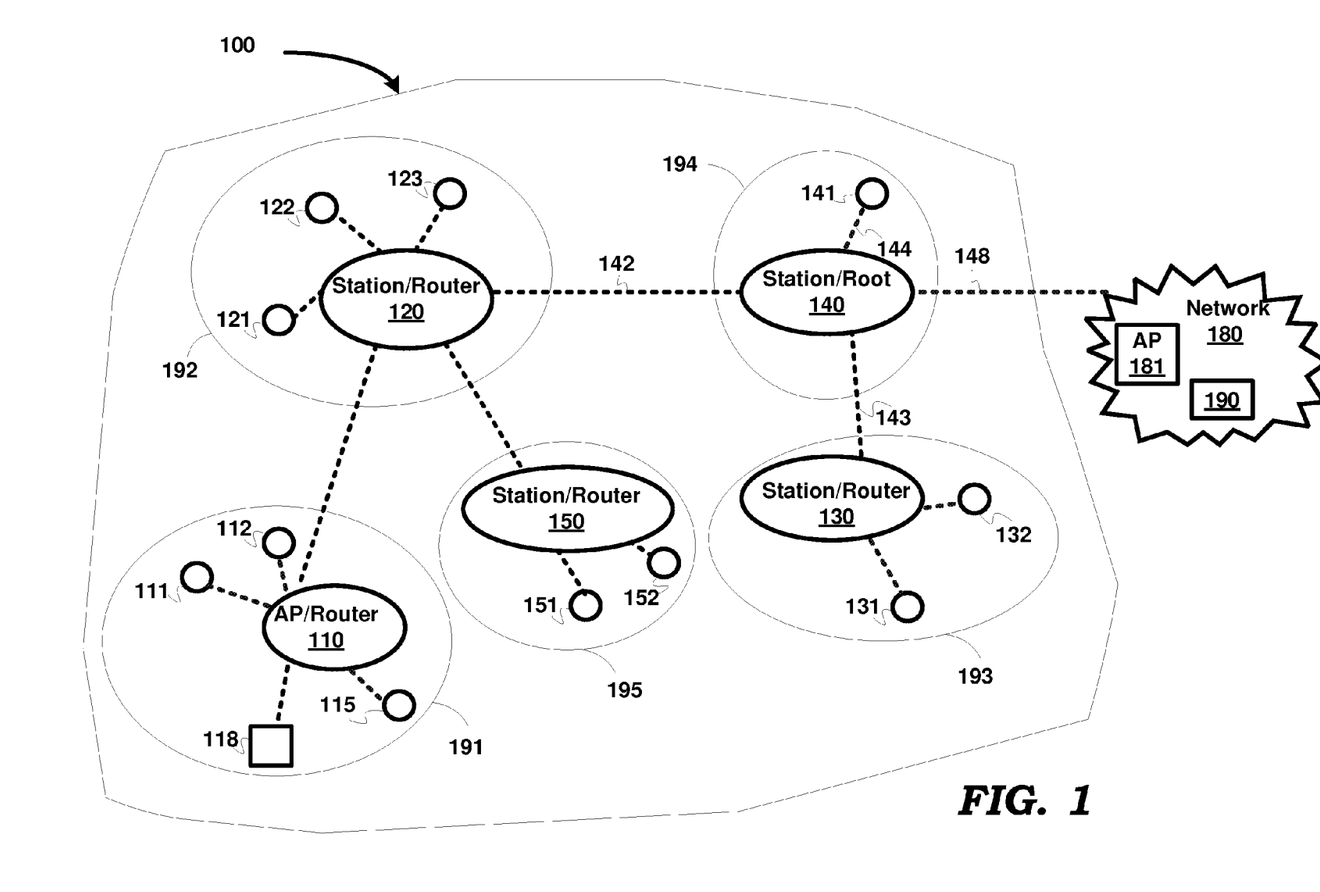
FIG. 1 is a diagram of an example environment in which several aspects of the present disclosure may be implemented.

FIG. 1 is a block diagram representing an example environment in which several aspects of the present disclosure can be implemented. The example environment is shown containing only representative systems for illustration. However, real world environments may contain more or fewer systems. FIG. 1 is shown containing wireless devices 110, 111, 112, 115, 118, 120, 121, 122, 123, 130, 131, 132, 140, 141, 150, 151, 152, network 180, AP 181 and wireless device 190.

Wireless devices 110, 111, 112 and 115 are shown part of wireless local network 191. Of these wireless devices, devices 111, 112 and 115 operate as end devices, and device 110 operates as a router, as described in sections below. Block 118 represents a wireless station, which communicates with wireless device 110 operating as an AP, according to WLAN standards also, as described in sections below. Each of devices 111, 112, and 115, and wireless station 118 is within communication range with AP/router 110, implying that each of 111, 112, 115 and 118 can send a layer-2 packet which is directly (i.e., no intermediate forwarders, etc.) received by AP/router 110 and vice versa. Based on the description below, it may be appreciated that wireless station 118 communicates via AP 110 after association with AP 110 in accordance with IEEE 802.11 standards, while wireless devices 111, etc., communicate also in accordance with those standards, but without the prior association operation.

The operation of other wireless local networks 192-195 is described briefly, in accordance with the description above of wireless local network 191. Wireless local network 192 is shown containing router 120 operating in conjunction with end devices 121, 122 and 123. Router 120 is shown operating as station in accordance with IEEE 802.11 standards, and thus marked as station/router 120. Wireless local network 193 is shown containing station/router 130 and end stations 131 and 132. Wireless local network 194 is shown containing station/root 140 and end station 141. As described in sections below, station/root 140 operates as a border router in accordance with RPL specifications. Wireless local network 195 is shown containing station/router 150 and end devices 151 and 152. Wireless local networks 191-195 are together shown as part of wireless mesh network 100.

Network 180 represents a wide area network such as the internet (World Wide Web), and is shown containing AP 181 and device 190. AP 181 is an edge node of network 180, and enables devices of wireless local networks s 191-195 to connect to devices (such as 190) in network 180. AP 181 is designed to be operable as a router to route packets received from devices in wireless local networks s 191-195 to a destination device in network 180. AP 181 represents a conventional AP according to the IEEE 802.11 standards, and is shown connected to node 140 on wireless path 148.

Although AP 181 is shown as being contained in network 180, in another embodiment of the present disclosure AP 181 is instead outside of network 180 (and part of wireless mesh network 100), but still connected to wireless station 140. In such an embodiment, AP 181 would be connected to a corresponding node (e.g., a router) in network 180 on a wired path, although not shown in FIG. 1.

According to an aspect of the present disclosure, the wireless devices (except device 118) of wireless local networks s 191-195 may form a wireless mesh network. Once formed, the wireless devices in the wireless mesh network can communicate with one or more devices (such as device 190) in network 180.

One protocol that is defined for forming a wireless mesh network is the RPL protocol described in RFC 6550 published by the Internet Engineering Task Force (IETF). The manner in which the wireless devices of wireless local networks s 191-195 may form a wireless mesh network using the RPL protocol is briefly described next with an example.

3. Forming a Wireless Mesh Network According to RPL

In an embodiment of the present disclosure each of nodes 110, 120, 130, 140 and 150 is configured (for example, by a user/administrator) as a router node, while each of the remaining nodes is configured as an end device. Device 118 may not be configured specifically to be either a router or an end device, and the operation of device 118 in the environment of FIG. 1 is described in sections below.

All wireless devices in wireless local networks s 191-195 are designed with capability to operate in the un-associated data transfer mode (as described below), in addition (except for node 110) to being a wireless station as specified by the IEEE 802.11 standards. Node 110, in addition to being capable of operating in un-associated data transfer mode, can simultaneously operate as a conventional AP as well, as described in sections below.

Although specific configurations for the devices of FIG. 1 are noted above, in general, any node can be configured as a router node or an end node. Whether a node is configured as a root node, router node or an end node may depend on factors such as the specific geographical layout of the nodes, proximity to other router nodes, etc., and may accordingly be decided by a user/administrator. A wireless mesh network formed of nodes in wireless local networks s 191-195 (excluding device 118) is designated herein as wireless mesh network 100.

Each of the nodes of wireless mesh network 100 is designed to be RPL-capable. An RPL-capable node is capable of forming a wireless mesh network (such as network 100) co-operatively according to the RPL protocol, as described briefly below. Node 118 is assumed not to be RPL-capable, and is not configured to be either a router or an end device. The manner in which node 118 is enabled to operate in the mesh environment of FIG. 1 is described in sections below.

Based on designated roles (router, end device or root) for each device, RPL operates to define (A) a tree structure of all routing nodes; and (B) routing information in each of the routing nodes indicating the next hop device for each destination IP address. For such a purpose, the RPL routing protocol specifies a set of ICMPv6 (Internet Control Message Protocol version 6) control messages to exchange graph related information (i.e., for formulation of routing information in individual nodes). These messages are called DIS (DODAG Information Solicitation), DIO (DODAG Information Object) and DAO (DODAG Destination Advertisement Object), and the format of each of the messages is described in detail in RFC 6550. The term DODAG stands for Destination Oriented Directed Acyclic Graph, and represents the network topology of a wireless mesh network.

With respect to (A), the tree-building process starts at the root node, which may be configured by a system administrator. In the example of FIG. 1, node 140 is assumed to represent the root node (also termed a border router), and is connected to AP 181 of network 180 by wireless path 148. Although only one border router is shown in FIG. 1, multiple border routers may exist, each connected to a same or corresponding wide area network such as network 130.

In forming a mesh network according to the RPL protocol, border router 140 broadcasts a DIO message. The DIO message includes the 128-bit IPv6 (Internet Protocol version 6) address of border router 140. Nodes 120, 130 and 141 are assumed to be in the listening vicinity (i.e., within communication range of) of border router 140, and receive the DIO message. Border router 140 broadcasts DIO messages based on expiry of a trickle timer. The time instances of broadcast of successive DIO messages by border router 140 may increase exponentially with respect to time as determined by expiry of the trickle timer. Border router 140 may select a channel (one of multiple frequency bands specified for use by IEEE 802.11 standards) on which to broadcast DIO frames based on the congestion in a channel, or based on the channel in which AP 181 is operating in. If border router 140 selects the same channel for operation as the channel in which AP 181 is operating, then the un-associated data transfer mode and station mode of border router 140 can operate with a same/single radio interface (single transmit and receive processing chains).

In response to receipt of the DIO message, each of nodes 120, 130 and 141 may transmit (separately) a corresponding (unicast) DAO message to border router 140, specifying that it (the corresponding one of nodes 120, 130 and 141) has selected border router 140 as its parent. In addition, based on the network prefix (specified in the DIO message) indicated by border router 140 in the broadcast DIO message, each of nodes 120, 130 and 141 assigns itself an IP address. The respective IP addresses may be the concatenation of the network prefix and the MAC address of the corresponding node. Thus, for example, the IP address of node 141 may be the concatenation of the network prefix and the MAC address of node 141. In response to receipt of the DAO messages from the respective ones of nodes 120, 130 and 141, border router 140 locally stores information specifying that nodes 120, 130 and 141 are its child nodes, as well as their IP addresses.

It is noted here that while in the example of FIG. 1, nodes 120, 130 and 141 are noted as receiving a DIO message from root node 140 and as selecting root node 140 as the parent node, in general, nodes 120, 130 and 141 may receive DIO messages from multiple other router/root nodes, and make a decision based on certain rules (according to parameters such as objective function, DAG characteristics, advertised path cost, etc., as specified by the RPL protocol) as to which router/root node to designate as its parent.

Continuing with the description of how a wireless mesh network is formed, in addition to unicasting a DAO message (intended for the parent node), a node if configured to act as a router, also broadcasts another DIO message to advertise its presence to other nodes (not yet part of the wireless mesh network), thereby enabling such nodes to potentially join the mesh network. Thus, each of nodes 120 and 130 (being router nodes), broadcasts corresponding DIO messages to nodes in the listening vicinity, assumed in the example to include nodes 121, 122, 123, 131 and 132. However, if a node is a "leaf node" (end device), it simply designates the routing node from which a DIO message is received as a parent via a corresponding DAO message, and does not send any further DIO messages. In the example of FIG. 1, node 141 is a leaf node, and simply joins the wireless mesh network (by selecting border router 140 as a parent via a corresponding DAO message) without sending any DIO messages.

It is noted here that nodes in the wireless mesh network may also proactively solicit information (via DIO messages) from the neighboring nodes using DIS messages, as specified in RFC 6550.

As each parent node receives a DAO message (from the corresponding child node), the parent node adds the address of its child node in its routing table. A parent node also aggregates the address information received from various child nodes, and sends a DAO message containing such address information to its parent. Thus, for example, node 120, on receipt of DAO messages from end device nodes 121, 122, and 123 stores the addresses of end devices 121, 122 and 123 in an internal routing table. Additionally, node 120 transmits a DAO message to its (selected) parent node (border router 140), with the DAO message specifying that nodes 121, 122 and 123 are child nodes of node 120, the DAO message also containing the address information of child nodes 121, 122 and 123. In response to receipt of the DAO message, border router 140 creates routing table entries indicating that packets (received at node 140) with destination IP addresses of any of nodes 121, 122 and 123 need to be forwarded to router node 120.

Once wireless mesh network 100 is formed, data exchange between nodes in wireless mesh network 100, as well as between nodes in mesh 100 and devices in network 180, can occur according to the IP protocol, well known in the relevant arts. Each of the routers of wireless mesh network 100 would contain routing tables with entries specifying a next-hop node to which a received packet is to be forwarded for eventual delivery to a destination node. End devices on the other hand may not contain routing tables, but merely contain information (such as address) specifying a parent router node.

Figure 3A:
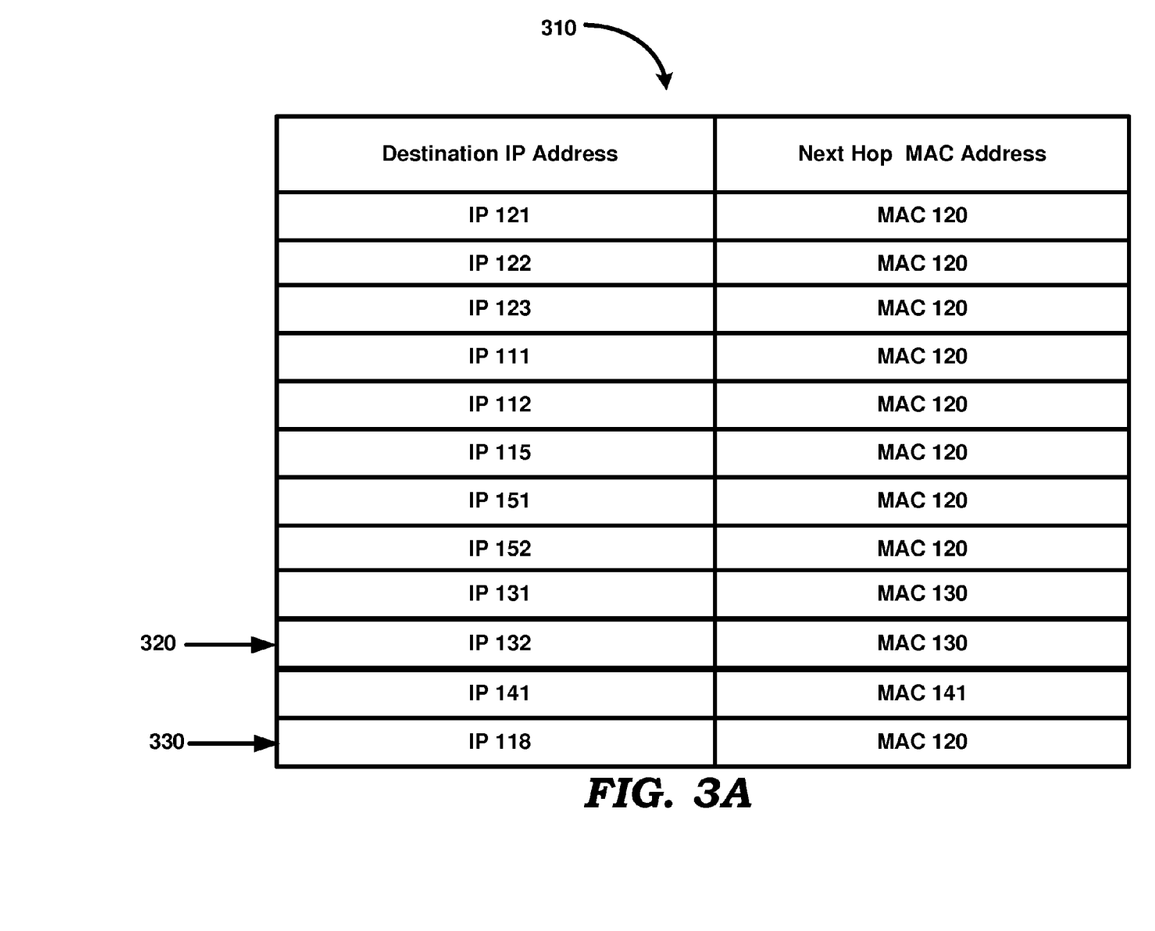
FIG. 3A is a diagram showing a routing table stored in a border router, in an embodiment of the present disclosure.

FIG. 3A is a diagram showing a routing table 310 stored in border router 140. The routing table entries correspond to the example of FIG. 1, described above. The column under heading 'Destination IP address' lists the IP addresses of the various destination nodes (end nodes) in wireless mesh network 100 of FIG. 1. The column under heading 'Next Hop MAC address' lists the destination MAC address of the next-hop node to which a packet must be forwarded when the destination IP address is that shown in the same row and under column "Destination IP address'. Thus, for example, on receipt of a wireless packet with destination IP address IP121 (IP address of node 121), border router 140 replaces the destination MAC address (its own MAC address) in the IP packet with the MAC address (MAC120) of router 120, and transmits the resulting wireless packet.

Figure 3B:
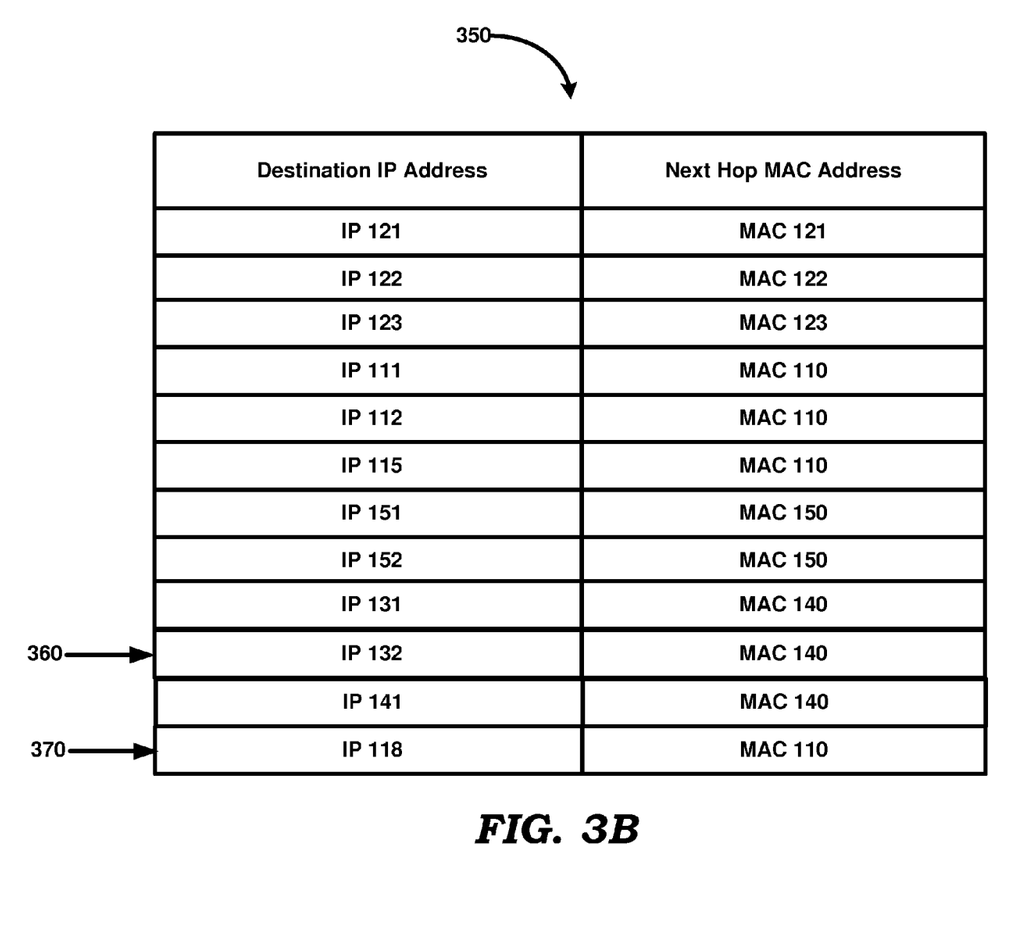
FIG. 3B is a diagram showing a routing table stored in a router node, in an embodiment of the present disclosure.

FIG. 3B is a diagram showing a routing table 350 stored in router node 120. The routing table entries correspond to the example of FIG. 1, described above. The column under heading 'Destination IP address' lists the IP addresses of the various destination nodes (end nodes) in wireless mesh network 100 of FIG. 1. The column under heading 'Next Hop MAC address' lists the destination MAC address of the next-hop node to which a packet must be forwarded when the destination IP address is that shown in the same row and under column "Destination IP address". Thus, for example, on receipt of a wireless packet with destination IP address IP131 (IP address of node 131), router node 140 replaces the destination MAC address (its own MAC address) in the IP packet with the MAC address (MAC140) of border router 140, and transmits the resulting wireless packet.

Each of the other routers of FIG. 1 would contain similar routing tables with corresponding entries.

Within wireless mesh network 100 thus formed, a packet from one node in wireless mesh network 100 to another node in wireless mesh network 100 travels 'up' to a common ancestor at which point it is forwarded in the 'down' direction to the destination. To illustrate, a packet from end node 111 destined for end node 132 would contain the IP address of end node 132 in the destination IP address field. End node 111 transmits the packet to router node 110 by indicating the MAC address of router node 110 in the destination MAC address field in the packet. Router node 110 receives the packet and inspects the destination IP address field in the packet, and based on a look-up of the local routing table in node 110, inserts the MAC address of router node 120 in the destination MAC address field in the packet and transmits the packet.

Router node 120 receives the packet, inspects the destination IP address field in the packet, and based on a look-up of the local routing table (table 350 of FIG. 3B) in node 120, places the MAC address of border router 140 in the destination MAC address field in the packet, and transmits the wireless packet. Row 360 indicates the MAC address entry corresponding to the IP address of end node 132.

Border router 140 receives the packet, inspects the destination IP address field in the packet, and based on a look-up of the local routing table (table 310 in border router 140), places the MAC address of router node 130 in the destination MAC address field in the packet, and transmits the packet. Row 320 indicates the MAC address entry corresponding to the IP address of end node 132.

Router node 130 receives the packet, inspects the destination IP address field in the packet, and based on a look-up of its local routing table, places the MAC address of end node 132 in the destination MAC address field in the packet, and transmits the packet. End node 132 receives the packet, observes that both the destination IP address and destination MAC address in the packet correspond to its own IP and MAC addresses, and consumes (i.e., no further forwarding per IP) the payload in the packet.

In a prior approach, each of end devices 111, 112, 115, 121, 122, 123, 131, 132, 141, 151 and 152 is configured to operate as a 'conventional' wireless station of a WLAN according to IEEE 802.11 family of standards, while each of router nodes 110, 120, 130, 140 and 150 is configured to operate as a 'conventional' access point (AP) of a WLAN according to IEEE 802.11 family of standards. Operation as a conventional wireless station implies that a wireless station first exchanges association and/or authentication packets with the corresponding AP of a WLAN, prior to exchange of data (information packets) with another wireless station via the AP. Similarly, operation as a conventional AP implies that an AP transmits association and authentication response packets to a wireless station seeking to be associated with the AP.

Further, a conventional AP also regularly transmits beacons according to IEEE 802.11 specifications to advertise its presence to wireless stations, thereby enabling the wireless stations to associate with it (AP). It is noted that, in the prior approach, such 'conventional' operation may occur during formation of a wireless mesh network by the nodes, as described in detail above. Further, such conventional operation may continue during exchange of data packets between nodes of wireless mesh network 100 after wireless mesh network 100 is formed.

Further still, in the prior approach, communication between wireless stations of different WLANs may require the corresponding pairs of APs to be connected to each other according to Wireless Distribution System (WDS) procedures. For example, nodes 110 and 120, each being a conventional AP in the prior approach, may require WDS techniques to communicate with each other.

The prior approach may have several drawbacks. For example, the requirement of wireless stations to first be authenticated and associated with a corresponding AP may represent additional overhead, in terms of packet exchange. Further, transmission of beacons at regular intervals by the APs may be associated with a corresponding power consumption cost, as well as increased transmission activity in the transmission channel, which may slow down exchange of data (information) packets.

Similar transmission/processing overheads may be present for association, authentication, etc., between APs (in WDS mode) as well, as is well known in the relevant arts. For example, since WDS mode operates as a bridge at layer-2 (L2) level without having knowledge of routing, it may be involve unnecessary overhead in forwarding a packet to the appropriate destination. According to WDS, each AP would send a received packet to all other connected APs, and not just the appropriate next-hop AP (since the APs do not know the next-hop device). In the example of FIG. 1, and according to WDS, if node 110 has to send a packet to node 122, node 110 would send forward the packet to both of APs 150 and 120 (assuming a WDS connection has been formed between nodes 110 and each of nodes 120 and 150), which would represent an unnecessary overhead.

Several aspects of the present invention overcome at least some of the problems noted above with respect to the prior approach, and are described next with respect to a flowchart.

4. Un-Associated Data Transfer Mode

Figure 2:
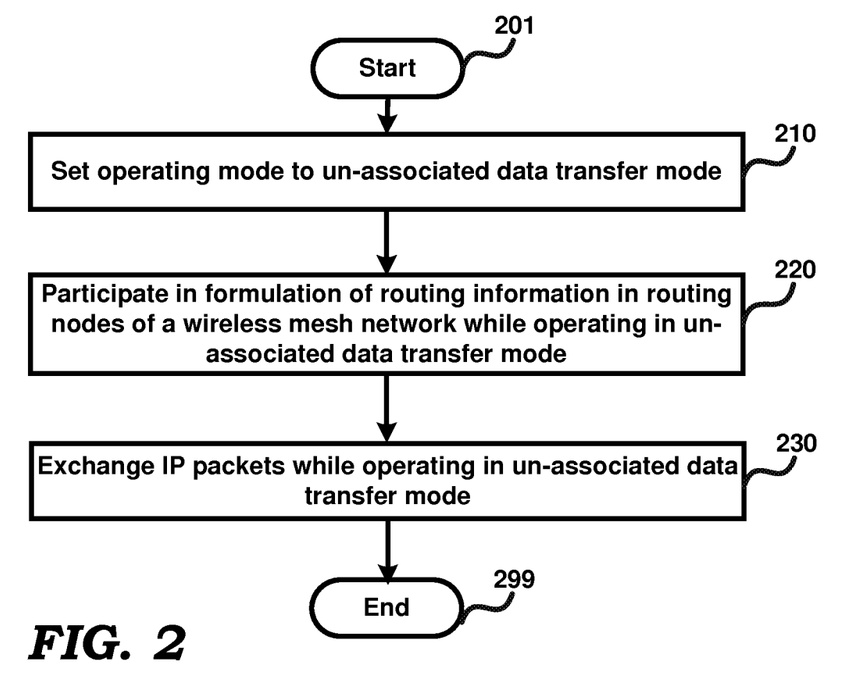
FIG. 2 is a flow chart illustrating the manner in which a node of a wireless mesh network is operated, according to an aspect of the present disclosure.

FIG. 2 is a flow chart illustrating the manner in which a node contained in a wireless mesh network is operated, according to an aspect of the present disclosure. The flowchart is described below with respect to wireless nodes of FIG. 1 and with respect to RPL protocol merely for illustration. However, at least some of the features can be implemented in other systems, protocols and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, an operating mode of the node is set to un-associated data transfer mode at a layer-2 level. "Un-associated data transfer mode" refers to an operating mode of a node (AP or wireless station)) without requiring association and authentication procedures to have taken place with a corresponding node (AP or wireless station) prior to being allowed to exchange data packets with other nodes. The term 'at a layer-2 level' indicates that the un-associated data transfer mode operates at the medium access control (MAC) layer level. As is well known in the relevant arts, association and authentication frames and response frames are MAC-level frame exchanges, not requiring higher layer (e.g., layer-3 level) operations.

When the node corresponds to a wireless station operated in the un-associated data transfer mode, the wireless station does not transmit association and authentication frames to an AP, but sends/receives packets to/from the AP without such association/authentication having to occur. Similarly, an AP (operating in un-associated data transfer mode) does not require the corresponding wireless station to be associated with it, for operating as a switch/aggregator in forwarding the packets from/to the wireless station. The AP also does not transmit beacons when operated in the un-associated data transfer mode, for the purpose of such wireless stations. Thus, the number of packets transmitted/processed is reduced, thereby leading to reduced power consumption and high grid throughput.

With respect to AP to AP communications also, no prior association (including authentication) may be required between the two APs. At least when compared to WDS mode when such prior association may be required, the number of packets transmitted/processed is reduced due to the absence of prior association, even in the case of AP to AP communication. Control then passes to step 220.

In step 220, the node participates in formulation of routing information in routing nodes of a wireless mesh network while operating in the un-associated data transfer mode. Participation implies sending of at least a packet, which is necessary for the routing information to be formulated in any of the nodes of wireless mesh network 100. Formulation implies that the content/IP information of the packet forms at least a portion of the routing information in at least one node.

The formulation of routing information in routing nodes of a wireless mesh network is performed according to the RPL protocol as described above, except that the node is operating in the un-associated data transfer mode while such participation occurs. Each router in wireless mesh network 100 (now formed with each constituent node operating in the un-associated data transfer mode) would contain corresponding routing tables. The routing tables in routers 140 and 120 are identical to those shown in FIGS. 3A and 3B. Other routers of wireless mesh network 100 would have corresponding routing tables.

Thus, the node, while operating in the un-associated data transfer mode, may receive DIO messages from one or more router nodes, may assign itself an IP address, and may transmit a DAO message as described in detail above. If the node is itself configured as a router node, the node further transmits a DIO message to other nodes in the listening vicinity, and may receive corresponding DAO messages from such other nodes, and make routing entries in a routing table contained within, as also described above. If the node is a router node, the node may further aggregate address information received from various child nodes via corresponding DAO messages, and in turn may send a DAO message containing such address information to its parent, thereby enabling the parent to form entries in its routing table. If the node is an end device, it may simply designate a corresponding router node as its parent node by sending a DAO message.

In step 230, the node exchanges IP packets while continuing operation in un-associated data transfer mode. An IP packet is characterized in having IP addresses designating the source and destination nodes. Once the formation of the routing information is complete in the network, the node, if configured as an end device, may send/receive IP data packets to/from another end device in wireless mesh network 100, while continuing to operate in the un-associated data transfer mode. If configured as a router, the node forwards received data packets to a next-hop node (determined, as described above) based on its routing table entries, while continuing to operate in the un-associated data transfer mode.

It may be appreciated that not having to operate as a conventional AP or wireless stations (i.e., requiring prior association between wireless stations and APs according to the IEEE 802.11 protocols) may translate to savings in terms of power in the nodes of wireless mesh network 100, as well as increased data throughput due to absence of beacon frames. At the same time, all nodes of mesh network 100 may communicate with systems within network 100, as well as those accessible via network 180 using Internet Protocol.

The features described above can be implemented in various ways, as will be apparent to a skilled practitioner based on the disclosure provided herein. The description is continued with respect to some example embodiments.

5. Communication Layers

Figure 4:
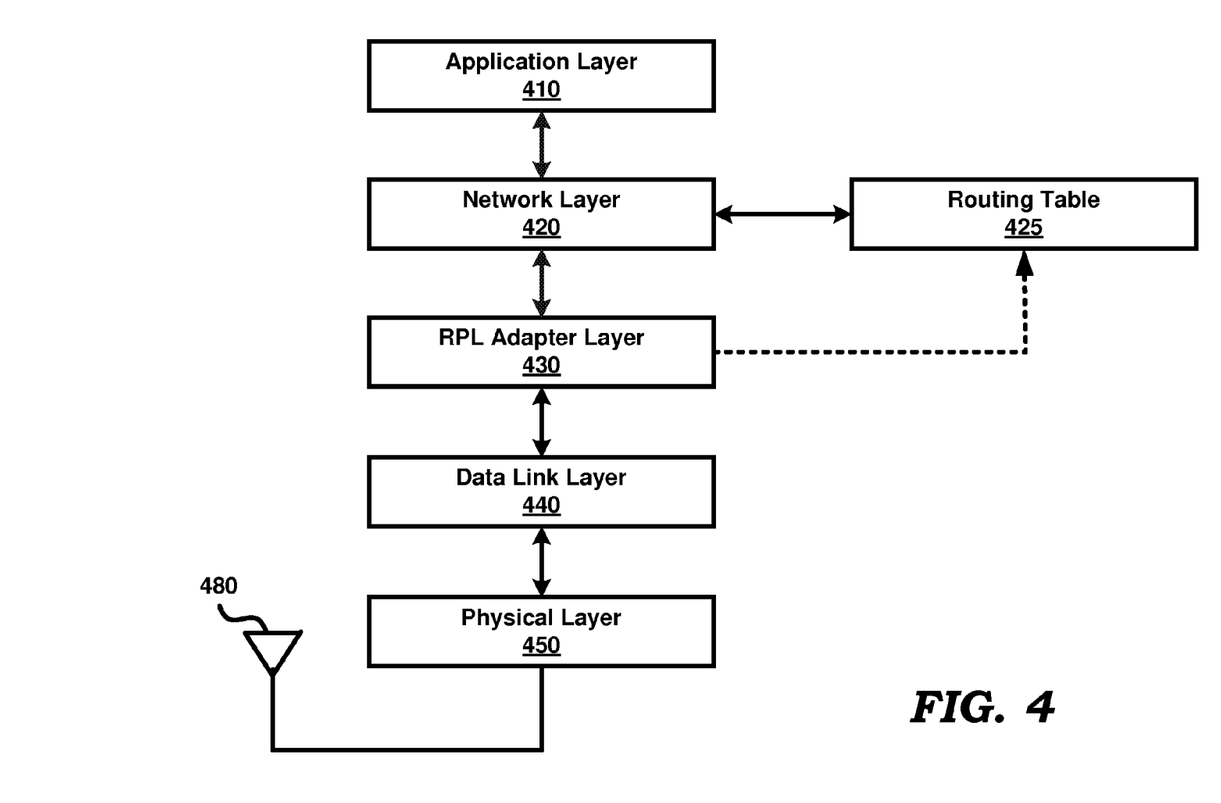
FIG. 4 is a block diagram showing the various communication layers in a node of a wireless mesh network, in an embodiment of the present disclosure.

FIG. 4 is a block diagram showing the various communication layers (protocol stack) in a node of wireless mesh network 100, and which are operative in sending/receiving/routing of data packets in wireless mesh network 100. Merely for illustration, it is assumed that the blocks of FIG. 4 are contained in router node 120. However, the other routers as well as end-nodes of wireless mesh network 100 may have similar or identical protocol stacks.

Application layer 410, network layer 420, data link layer 440 and physical layer 450 of FIG. 4 may be implemented to generally conform to the ISO OSI (International Standards Organization Open Systems Interconnect) model, and are only briefly described below, since the corresponding implementations of the blocks would be well known to one skilled in the relevant arts on reading the disclosure herein. Further, only the relevant blocks of the protocol stack are shown in FIG. 4, and typically more blocks (such as transport layer etc.) according to the ISO OSI model may be present, as also would be apparent to one skilled in the relevant arts.

Physical layer 450 represents the electrical and physical interface between node 120 and a transmission medium (here a wireless medium). Physical layer 450 receives data from data link layer 440 and forwards the data to antenna 480 for transmission. Physical layer 450 receives data from antenna 480 and forwards the data to data link layer 440.

Data link layer 440, operates to provide a reliable data link between node 120 and other nodes in wireless mesh network 100, and may perform medium access control (MAC) as well as error checking operations. Data link layer 440 is configured to operate in un-associated data transfer mode, which implies that data packet transfer is permitted without the necessary association information between AP and station. However, to support operation of third party devices (e.g., device 118) in conventional operation (as described below), data link layer 440 may be designed to operate simultaneously in conventional AP mode as well. Physical layer 450 and data link layer 440 may be designed to conform to the IEEE 802.11 family of specifications, and can be implemented in a known way in accordance with the description provided herein.

RPL adapter layer 430 performs operations needed to enable node 120 to become part of wireless mesh network 100 by participating in forming routing information in routing nodes of wireless mesh network 100, as described in detail above. Thus, RPL adapter layer 430 may form DIO messages (which are then forwarded via link layer 440 and physical layer 450 for transmission via antenna 480) to advertise presence of node 120 to other nodes in the listening vicinity of node 120. RPL adapter layer 430 may receive DAO messages from other router nodes and/or end nodes (via antenna 480, physical layer 450 and data link layer 440), create and populate routing table 425 with the corresponding entries (as described above with respect to FIGS. 3A-3B), aggregate DAO messages from child nodes and communicate information contained therein to a parent node, etc., according to the RPL protocol, and as described above.

Figure 5A:
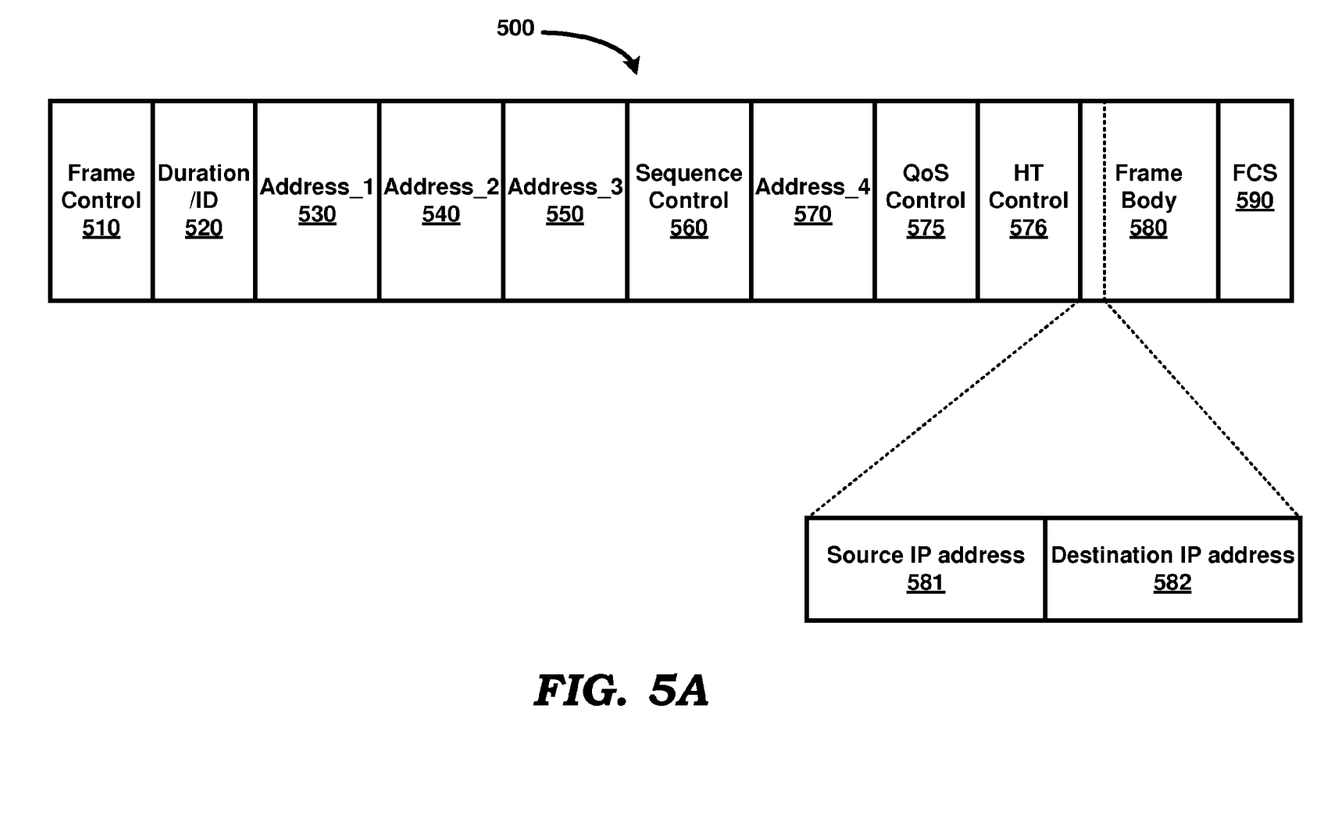
FIG. 5A is a diagram of a wireless packet in an embodiment of the present disclosure.

Network layer 420 (present only in case of router nodes) performs operations to enable delivery (by appropriate routing) of data packets from one node to another node in a network (here wireless mesh network 100). Network layer 420 may retrieve/inspect entries stored in routing table 425 to assist in the routing operations (i.e., determining the next hop information), as briefly described below with respect to example packet 500 of FIG. 5. Thus, network layer 420 instructs data link layer 440 to transmit IP packet to the next hop MAC address determined based on examination of routing table 425.

Application layer 410 represents a communications component that allows software applications executing in node 120 to communicate with software applications in other nodes via the other blocks shown in FIG. 4.

FIG. 5A shows the format of a wireless packet 500 (which is also an IP packet/layer-3 data packet) in accordance with 802.11 standards. Wireless packet 500 is shown containing fields Frame Control 510, Duration/ID 520, Address_1 530, Address_2 540, Address_3 550, Sequence Control 560, Address_4 570, QoS Control 575, HT control 576, Frame Body 580 and FCS 590. Source IP address 581 and Destination IP address 582 are shown encapsulated in Frame Body 580, and respectively represent the IP addresses of the source/originator of packet 500 and destination/consumer of packet 500. Frame body 580 additionally contains the payload (data) sought to be transmitted in the packet. A detailed description of the fields of packet 500 is provided in Section 8 of the IEEE Std 802.11-2012 document available with the International Telecommunications Union (ITU). Only those fields as relevant to this disclosure are described herein. It is also noted that, in practice, wireless packet 500 may contain more or fewer fields or proprietary modifications depending on the specific deployment environment.

Frame Control 510 internally contains several fields for specifying various frame control parameters such as protocol version, To DS, From DS, Power Management, etc.

Figure 5B:
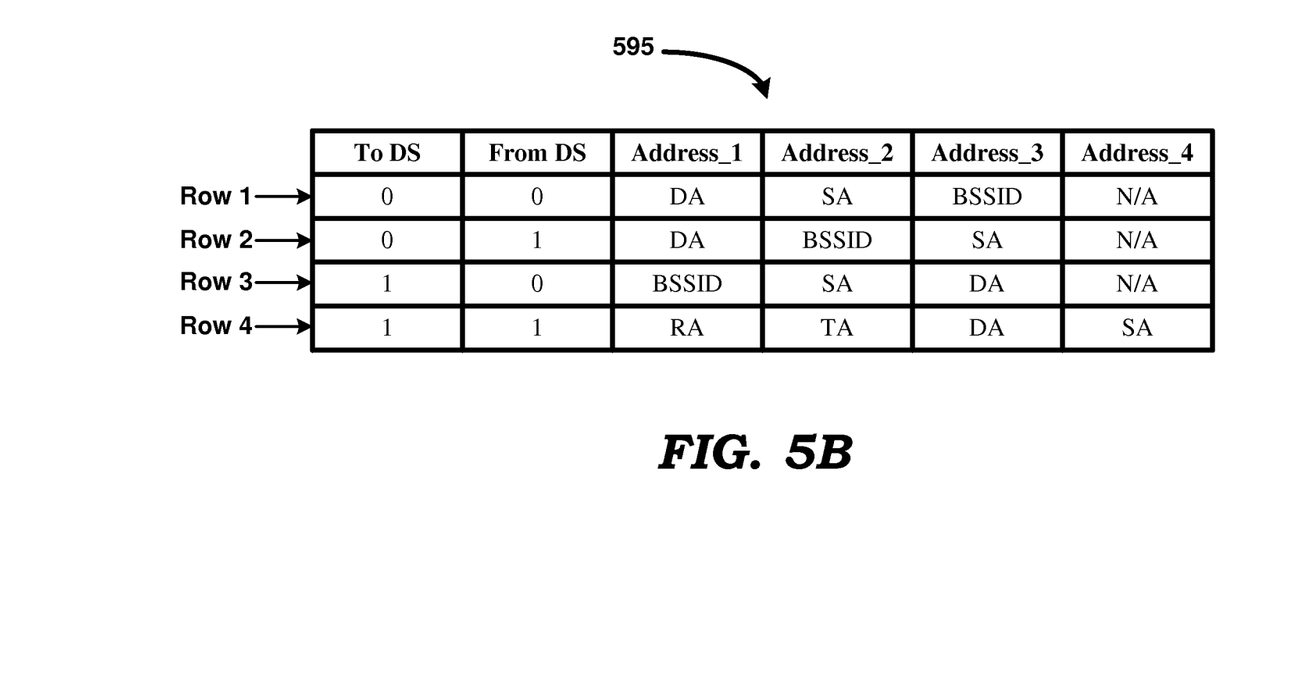
FIG. 5B is a table illustrating the correspondence between address fields and a pair of frame control bits in a packet according to IEEE 802.11 protocol.

According to the IEEE 802.11 standards, a logic zero in each of the To DS and From DS fields signifies that the frame is being transmitted from one wireless station (STA) of an independent BSS (IBSS or ad hoc network) to another wireless station of the IBSS, or is a control or management frame. A logic one in each of the To DS and From DS fields signifies that the frame is being transferred from one AP to another AP in a wireless distribution system (WDS). A logic zero entry in the To DS field and a logic one entry in the From DS field signifies that the frame is being transmitted from an AP to a wireless station in an infrastructure BSS. A logic one entry in the To DS field and a logic zero entry in the From DS field signifies that the frame is being transmitted from a wireless station to the corresponding AP in an infrastructure BSS. Table 595 of FIG. 5B shows the correspondence between combinations of the To DS and From DS fields and address fields Address_1, Address_2, Address_3 and Address_4 according to the IEEE 802.11 protocol.

However, in embodiments of the present disclosure, nodes (except for conventional device 118 and AP 110 operating in conventional AP mode, as described below) of wireless mesh network 100, being special (non-conventional/proprietary) devices, transmit data packets to a next hop node with the To DS and From DS fields each set to logic zero (as shown in Row 1 of FIG. 5B). Thus, Address_1 530 would contain the MAC address of the next hop device and Address_1 540 would contain the MAC address of the current/transmitting device. Address_550 would always contain the network ID of wireless mesh network 500. The network ID of wireless mesh network may be configured manually by a user/administrator. Address_4 570 is not present, or if present, is not used. Whether packet 500 contains Address_4 570 or not may be set by the corresponding bit/bits in Frame control 510, per the IEEE 802.11 protocol. Source IP address 581 and destination IP address 582 would contain the IP addresses of the source and destination nodes according to conventional IP operation.

To illustrate the above convention (used in embodiments of the present disclosure) with an example, a packet originating from router node 110 and destined to router node 120 will have both the To DS and From DS fields set to logic zero (contrary to logic one in conventional operation according to IEEE 802.1 protocol). In the example, Address_1 530 would contain the MAC address of router node 120. Address_2 540 would contain the MAC address of router node 110. Address_3 would contain the network ID of wireless mesh network 100. Source IP address 581 would contain the IP address of router node 110 and destination IP address 582 would contain the IP address of router node 120. Frame body 580 would additionally contain the payload (data) sought to be transmitted from node 110 to node 120.

The description is continued with another example illustrating the operations at the various communication layers of node 120 in routing packet 500, when packet 500 originates at node 131 and is destined for node 115.

Physical layer 450 receives wireless packet 500 from antenna 480 and forwards wireless packet 500 to data link layer 440. When received at physical layer 450, fields source IP address 581 and destination IP address 582 in wireless packet 500 would respectively contain the IP addresses of node 131 and node 115, and fields Address_1 530 and Address_2 540 would respectively contain the MAC address (BSSID) of node 120 and the MAC address (BSSID) of node 140.

Link layer 440 observes that the destination MAC address field 530 contains the MAC address of node 120, and forwards the packet to RPL adapter layer 430.

RPL adapter layer 430 merely forwards the packet received from link layer 440 to network layer 420. RPL adapter layer 430 is operative to add/update headers when hop-by-hop option is specified in IPV6 packets, and can be implemented in a known way.

Network layer 420 observes from destination IP address 582 that the destination IP address is that of node 115. Network layer 420 inspects routing table 425 and retrieves the MAC address entry (of node 110) corresponding to the IP address entry of node 115. Network layer 420 places (by overwriting prior address) the MAC address of node 110 in Address_1 530 of packet 500. Network layer 420 then forwards the packet to data link layer 440 via RPL adapter layer 430.

Data link layer 440 places the MAC address of node 120 in Address_2 540, and forwards the packet to physical layer 450, which then transmits the packet on the wireless medium via antenna 480.

It is noted here that a wireless station of wireless mesh network 100 can communicate with devices in network 180 potentially in two different ways. If a wireless station can directly communicate with (by virtue of being within communication range of) AP 181 (edge node of network 180), then the wireless station can relay a packet (received from another device of wireless mesh network) to internet 180 while operating as a conventional wireless station. In such a case, the wireless station (140 in the example of FIG. 1) first associates (according to IEEE 802.11) with AP 181, and then forwards a received packet to AP 110. AP 181 further forwards/routes the packet to a next-hop device in network 180 based on the destination IP address encapsulated in frame body/payload field of the packet.

On the other hand, if the wireless station is not within direct communication range of AP 181, then the wireless station operates in un-associated data transfer mode to forward a packet through wireless mesh network 100, as described in detail above. In such a case, a node (root node 140 in the example of FIG. 1) that is connected to AP 181 receives the packet and forwards the packet to AP 181 while itself operating as a wireless station, and thus to a destination device in network 180.

While the packet format and processing is described above with respect to transmission of a data packet from one end node to another, the packet format and processing during formulation of routing information may be similarly understood. In particular, when a root node and routers send the DIO packets, the DIO content may be encapsulated as a MAC broadcast (i.e., address-1 530 set to all FFs). However, all DAO responses may be encapsulated as MAC point-to-point transmissions, since the destination MAC address is known in the sender. Both the MAC broadcasts and the point-to-point transmissions are sent in un-associated data transfer mode, as described above.

From the description above, it may be appreciated that all RPL capable wireless devices may communicate in un-associated data transfer mode in both formulation of routing information and thereafter exchanging data/information packets.

To support non-RPL-capable wireless devices, a router node in wireless mesh network 100 additionally (simultaneously) also operates in the conventional AP mode. Referring again to FIG. 1, node 118 (also a wireless device) is not RPL-capable, and can operate only as a conventional wireless station, and therefore cannot participate (on its own) in routing-information formulation (using DIO messages, DAO messages, etc.) according to RPL. The manner in which a wireless device such as 118 can join and be a part of wireless mesh network 100 is briefly described next.

6. Enabling Non-RPL-Capable Devices to Join a Wireless Mesh Network

In an embodiment of the present disclosure, router 110 operates simultaneously as a conventional AP as well as in the un-associated data transfer mode. Simultaneous operation as a conventional AP as well as in un-associated data mode can be performed while operating in a single channel (single transmit/receive radio, each tuned to transmit/receive on a same/single frequency band).

Simultaneous operation implies that processing capabilities for operation as a conventional AP as well as to operate in un-associated data transfer mode are active/available simultaneously, and the corresponding set of processing capabilities can be invoked on the basis of which mode to operate in (for example based on inspection of the field Address_3 550 of a received packet, Address_3 550 being always the network ID of wireless mesh network 100 when operating in un-associated data transfer mode, and being either the source or destination MAC addresses when in conventional AP mode).

When performing operations conforming to a conventional AP, node 110 is designated herein as AP 110. Operating as an AP, router 110 transmits beacons according to IEEE 802.11 standards.

Device 118, operating as a conventional wireless station, receives one or more beacons transmitted by AP 110, transmits association and authentication frames to AP 110 in the conventional manner (i.e., as specified by the IEEE 802.11 standard). Thus, the communication between conventional wireless station 118 and AP 110 occurs at the layer-2 level (MAC level, without IP addresses), and the convention of row 2 or row 3 is used depending on whether the layer-2 packet (association request, association response, etc.) is transmitted to AP 110 from device 118 or from AP 110 to device 118. AP 110 authenticates device 118, and allows device 118 to associate with it via corresponding authentication response and association response frames.

Router node 110 may maintain a routing table entry indicating that device 118 is its child node. Router node 110 may assign an IP address to device 118. In one embodiment, router node 110 contains a (Dynamic Host Configuration Protocol (DHCP) server, which assigns an IP address to device 118. In another embodiment, device 118 forms its IP address based on contents in a router advertisement packet transmitted by router node 110. On receipt of a router advertisement packet, device 118 obtains the prefix from the router advertisement packet, and constructs its IP address based on the prefix, for example, by concatenating the prefix and the MAC address of device 118.

Router node 110 may transmit a DAO packet to its parent node (router 120) indicating the presence of device 118 as its child node, as well as the IP address of device 118. Router node 120 may update its routing table with a corresponding entry, indicated by row 370 in FIG. 3B. Router node 120 may, in turn, transmit a DAO packet its parent node (border router 140) indicating the presence of device 118 as a child node of router node 110, as well as the IP address of device 118. Border router 140 may update its routing table with a corresponding entry, indicated by row 330 in FIG. 3A.

Once the routing table entries for conventional wireless device 118 are created in nodes 110, 120 and 140, conventional wireless device 118 can communicate with devices in wireless mesh network 100 as well as network 180.

For transmitting a packet to a device in network 180, device 118 encapsulates an IP packet (with the destination and source IP addresses) with corresponding MAC headers (similar to packet 595 of FIG. 5B), and transmits the packet to AP 110. The packet is routed by nodes 120, 140 and 181 into network 180, and is further routed to the target destination device within network 180. Device 118 is not 'aware' of the presence of wireless mesh network 100, and continues operation as a conventional wireless device (station), and requires that node 110 continue operation additionally in AP mode to enable device 118 to communicate with devices in wireless mesh network 100 as well as network 180.

The implementation details of a wireless node of wireless mesh network 100 in an embodiment are described next.

7. Wireless Node

Figure 6:
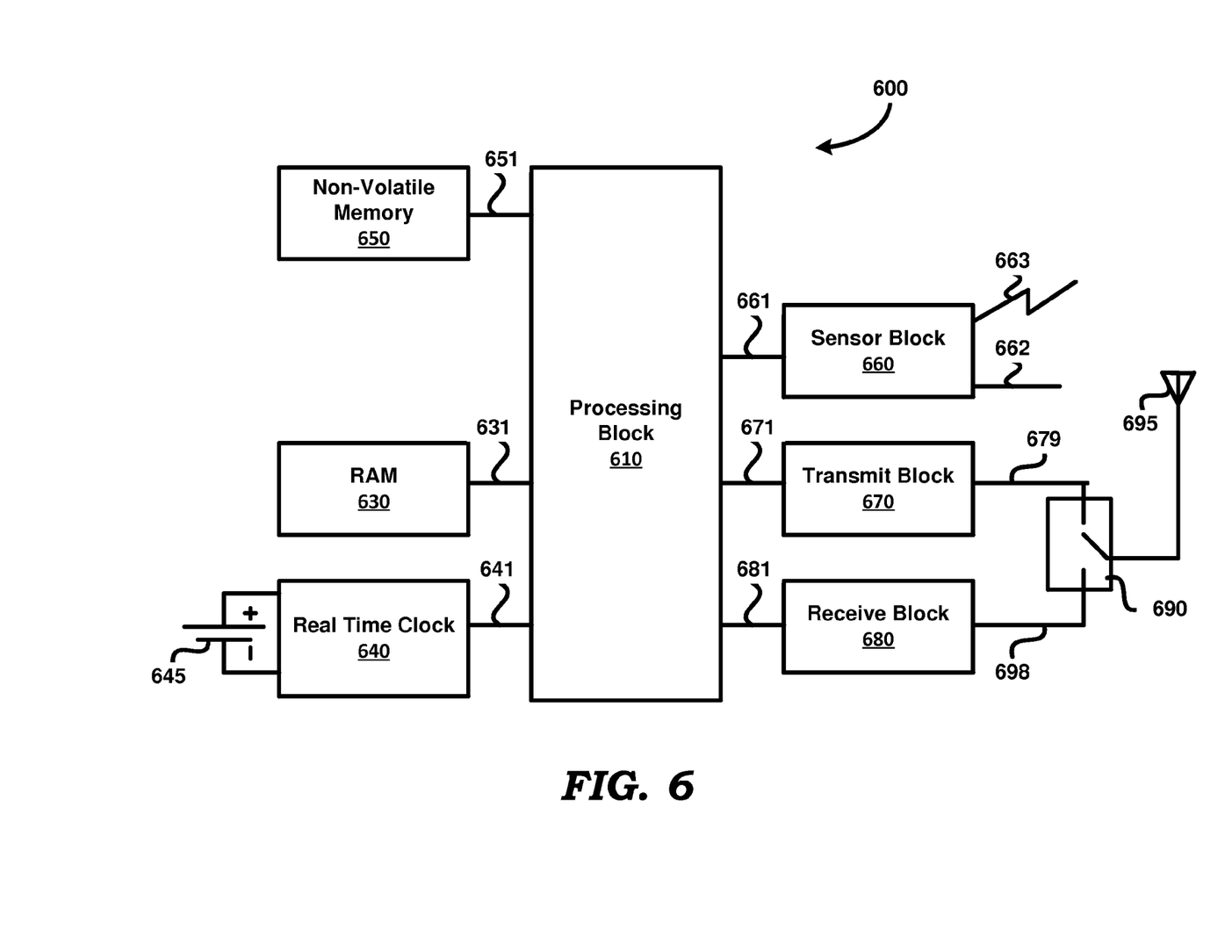
FIG. 6 is a block diagram showing the implementation details of a wireless device in an embodiment of the present disclosure.

FIG. 6 is a block diagram showing the implementation details of a wireless device in an embodiment of the present disclosure. Wireless device 600 may correspond to any of the nodes (router or end station, AP or wireless station) of wireless mesh network of FIG. 1. Wireless station 600 is shown containing processing block 610, random access memory (RAM) 630, real-time clock (RTC) 640, battery 645, non-volatile memory 650, sensor block 660, transmit block 670, receive block 680, switch 690 and antenna 695. The whole of wireless station 600 may be implemented as a system-on-chip (SoC), except for battery 645 and antenna 695. Alternatively, the blocks of FIG. 6 may be implemented on separate integrated circuits (IC).

Again, the components/blocks of wireless device 600 are shown merely by way of illustration. However, wireless device 600 may contain more or fewer components/blocks. Further, although not shown in FIG. 6, all blocks of wireless device 600 may be connected automatically to an auxiliary power source (such as battery 645) in the event of failure of main power source (not shown).

Sensor block 660 may contain one or more sensors, as well as corresponding signal conditioning circuitry, and provides on path 661 measurements/values of physical quantities such as temperature, pressure, etc., sensed via wired path 662 or wireless path 663. It may be appreciated that when wireless device 600 corresponds to only an AP/aggregator/router, sensor block 660 may be absent in such devices.

Antenna 695 operates to receive from and transmit to a wireless medium, corresponding data packets. Switch 690 may be controlled by processing block 610 (connection not shown) to connect antenna 695 either to receive block 680 via path 698, or to transmit block 670 via path 679, depending on whether wireless device 600 is to receive or transmit.

Transmit block 670 receives data to be transmitted on path 671 from processing block 610, generates a modulated radio frequency (RF) signal according to IEEE 802.11 standards, and transmits the RF signal via switch 690 and antenna 695. Receive block 680 receives an RF signal bearing data via switch 690, path 698 and antenna 695, demodulates the RF signal, and provides the extracted data to processing block 610 on path 681.

RTC 640 operates as a clock, and provides the 'current' time to processing block 610 on path 641. RTC 640 may be backed-up by battery 645 (in addition to the normal source of power, not shown in the Figure). RTC 640 may also contain a trickle timer which may be controlled to operate as described above. RTC 640 may also contain memory to store critical information received from processing block 610. Although not shown as such in FIG. 6, battery 645 may also be used as back-up power to one or more of the other components/blocks of station 600. Thus, for example, the power supply to flash memory 620 may be automatically switched (by corresponding circuitry not shown) to battery 645 in case of failure of the main power source (not shown).

Non-volatile memory 650 is a non-transitory machine readable medium, and stores instructions, which when executed by processing block 610, causes wireless device 600 to operate as described above (including the layers of FIG. 4 and exchange of packets). The instructions include those that enable wireless device 600 to operate as a border router, router or end device, operate in un-associated data transfer mode, and participate in the formulation of routing information in routing nodes of wireless mesh network 100. In addition, when wireless device 600 represents a router, non-volatile memory 650 further stores instructions to enable wireless device 100 to operate in conventional AP mode and allow association and authentication of non-RPL-capable wireless devices such as device 118.

Processing block 610 (or processor in general) may contain multiple processing units internally, with each processing unit potentially being designed for a specific task. Alternatively, processing block 610 may contain only a single general-purpose processing unit. Processing block 610 may execute instructions stored in non-volatile memory 650 or RAM 630 to enable wireless node 600 to operate according to several aspects of the present disclosure, described above in detail.

RAM 630 is a volatile random access memory, and may be used for storing instructions and data. Thus, for routing tables maintained by wireless device 600 may be stored in RAM 630.

RAM 630 and non-volatile memory 650 (which may be implemented in the form of read-only memory/ROM/Flash) constitute computer program products or machine (or computer) readable medium, which are means for providing instructions to processing block 610. Thus, such medium can be in the form of removable (floppy, CDs, tape, etc.) or non-removable (hard drive, etc.) medium. Processing block 610 may retrieve the instructions (via corresponding paths 651 and 631), and execute the instructions to provide several features of the present disclosure described above (including the flow-chart, communications stack, etc.).

The term "storage media/medium" as used herein refers to any non-transitory media that store data and/or instructions that cause a machine to operate in a specific fashion. Such storage media may comprise non-volatile media and/or volatile media. Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

8. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of operating a first wireless device of a first wireless local network comprised in a wireless mesh network operating at a layer-3 level, said wireless mess network being formed of a plurality of wireless local networks including said first wireless local network, wherein said method is performed in said first wireless device, said method comprising:
   setting an operating mode to un-associated data transfer mode at a layer-2 level;
   participating in formulation of routing information in routing nodes of said wireless mesh network while operating in said un-associated data transfer mode,
   wherein said formulation comprises sending and receiving layer-3 packets having content forming the basis for said routing information, while operating in said un-associated wireless mode; and
   exchanging, while continuing operation in said un-associated data transfer mode after said formulation, layer-3 data packets with a second wireless device comprised in said wireless mesh network, with each layer-3 data packet containing a corresponding data payload sought to be transmitted from a source end device to a destination end device.

2. The method of claim 1, wherein said first wireless device is a first router node and said second wireless device is a second router node, both at said layer-3 level.

3. The method of claim 2, wherein said routing information in each of said routing nodes comprises data indicating a next hop layer-2 address for each layer-3 address of a corresponding end device in said plurality of wireless local networks,
   wherein said second wireless device operates in said un-associated data transfer mode during said exchanging,
   wherein a structure of said layer-3 data packets is according to IEEE 802.11 standards, wherein each of a 'To DS' bit and a 'From DS' bit in a frame control field of said layer-3 data packets is set to zero.

4. The method of claim 3, further comprising operating said first wireless device additionally as a conventional access point (AP) according to IEEE 802.11 standards to enable a third wireless device to associate with said conventional AP, wherein said third wireless device is incapable of operating in said un-associated data transfer mode, wherein said first wireless device transmits beacons according to IEEE 802.11 standards during operation as said conventional access point (AP) according to IEEE 802.11 standards.

5. The method of claim 4, wherein said first wireless device, during operation as said conventional AP, exchanges a layer-2 packet with said third wireless device,
wherein a 'To DS' bit and a 'From DS' bit in a frame control field of said layer-2 packet are respectively set to zero and one when said packet is transmitted by said first wireless device to said third wireless device, and
wherein a 'To DS' bit and a 'From DS' bit in said frame control field of said layer-2 packet are respectively set to one and zero when said packet is transmitted by said third wireless device to said first wireless device.

6. The method of claim 5, wherein said first wireless device is a router node in said wireless mesh network, wherein said participating comprises:
receiving a DODAG Information Object (DIO) message from a second router node in said wireless mesh network; and
transmitting, in response to receiving said DIO message, a DODAG Destination Advertisement Object (DAO) message specifying that said first wireless device has joined said wireless mesh network by selecting said second router node as a parent node.

7. The method of claim 6, wherein said participating further comprises:
transmitting a second DIO message to nodes in the listening vicinity of said first wireless device;
receiving from an end node, a second DAO message specifying that said end node has joined said wireless mesh network by selecting said first wireless device as a parent node; and
adding a routing table entry in said first wireless device, wherein said routing table entry includes the medium control access (MAC) address of said end node.

8. The method of claim 7, wherein said first wireless node transmits a third DAO message to said second router node, said third DAO message specifying that said third wireless device has joined said wireless mesh network by selecting said first wireless device as a parent node.

9. A non-transitory machine readable medium storing one or more sequences of instructions for operating a first wireless device of a first wireless local network comprised in a wireless mesh network operating at a layer-3 level, said wireless mesh network being formed of a plurality of wireless local networks including said first wireless local network, wherein execution of said one or more instructions by one or more processors contained in said first wireless device enables said first wireless device to perform the actions of:
setting an operating mode of said first wireless device to un-associated data transfer mode at a layer-2 level;
participating in formulation of routing information in routing nodes of said wireless mesh network while operating in said un-associated data transfer mode,
wherein said formulation comprises sending and receiving layer-3 packets having content forming the basis for said routing information, while operating in said un-associated wireless mode; and
exchanging, while continuing operation in said un-associated data transfer mode after said formulation, layer-3 data packets with a second wireless device comprised in said wireless mesh network, with each layer-3 data packet containing a corresponding data payload sought to be transmitted from a source end device to a destination end device.

10. The non-transitory machine readable medium of claim 9, wherein said first wireless device is a first router node and said second wireless device is a second router node, both at said layer-3 level.

11. The non-transitory machine readable medium of claim 10, wherein said routing information in each of said routing nodes comprises data indicating a next hop layer-2 address for each layer-3 address of a corresponding end device in said plurality of wireless local networks,
wherein said second wireless device operates in said un-associated data transfer mode during said exchanging,
wherein a structure of said layer-3 data packets is according to IEEE 802.11 standards, wherein each of a 'To DS' bit and a 'From DS' bit in a frame control field of said layer-3 data packets is set to zero.

12. The non-transitory machine readable medium of claim 11, further comprising instructions for:
operating said first wireless device additionally as a conventional access point (AP) according to IEEE 802.11 standards to enable a third wireless device to associate with said conventional AP, wherein said third wireless device is incapable of operating in said un-associated data transfer mode,
wherein said first wireless device transmits beacons according to IEEE 802.11 standards during operation as said conventional access point (AP) according to IEEE 802.11 standards.

13. The non-transitory machine readable medium of claim 12, wherein said first wireless device, during operation as said conventional AP, exchanges a layer-2 packet with said third wireless device,
wherein a 'To DS' bit and a 'From DS' bit in a frame control field of said layer-2 packet are respectively set to zero and one when said packet is transmitted by said first wireless device to said third wireless device, and
wherein a 'To DS' bit and a 'From DS' bit in said frame control field of said layer-2 packet are respectively set to one and zero when said packet is transmitted by said third wireless device to said first wireless device.

14. The non-transitory machine readable medium of claim 13, wherein said first wireless device is a router node in said wireless mesh network, wherein said participating comprises:
receiving a DODAG Information Object (DIO) message from a second router node in said wireless mesh network; and
transmitting, in response to receiving said DIO message, a DODAG Destination Advertisement Object (DAO) message specifying that said first wireless device has joined said wireless mesh network by selecting said second router node as a parent node.

15. The non-transitory machine readable medium of claim 14, wherein said participating further comprises:
transmitting a second DIO message to nodes in the listening vicinity of said first wireless device;
receiving from an end node, a second DAO message specifying that said end node has joined said wireless mesh network by selecting said first wireless device as a parent node; and
adding a routing table entry in said first wireless device, wherein said routing table entry includes the medium control access (MAC) address of said end node.

16. The non-transitory machine readable medium of claim 15, wherein said first wireless node transmits a third DAO message to said second router node, said third DAO message specifying that said third wireless device has joined said wireless mesh network by selecting said first wireless device as a parent node.

17. A first wireless device of a first wireless local network comprised in a wireless mesh network operating at a layer-3 level, said wireless mess network being formed of a plurality of wireless local networks including said first wireless local network, said first wireless device being operable to:
- set an operating mode of said first wireless device to un-associated data transfer mode at a layer-2 level;
- participate in formulation of routing information in routing nodes of said wireless mesh network while operating in said un-associated data transfer mode,
- wherein said formulation comprises sending and receiving layer-3 packets having content forming the basis for said routing information, while operating in said un-associated wireless mode; and
- exchange, while continuing operation in said un-associated data transfer mode after said formulation, layer-3 data packets with a second wireless device comprised in said wireless mesh network, with each layer-3 data packet containing a corresponding data payload sought to be transmitted from a source end device to a destination end device.

18. The first wireless device of claim 17, wherein said first wireless device is a first router node and said second wireless device is a second router node, both at said layer-3 level.

19. The first wireless device of claim 18, wherein said routing information in each of said routing nodes comprises data indicating a next hop layer-2 address for each layer-3 address of a corresponding end device in said plurality of wireless local networks,
- wherein said second wireless device operates in said un-associated data transfer mode during said exchanging,
- wherein a structure of said layer-3 data packets is according to IEEE 802.11 standards, wherein each of a 'To DS' bit and a 'From DS' bit in a frame control field of said layer-3 data packets is set to zero.

20. The first wireless device of claim 19, further operable to operating additionally as a conventional access point (AP) according to IEEE 802.11 standards to enable a third wireless device to associate with said conventional AP, wherein said third wireless device is incapable of operating in said un-associated data transfer mode,
- wherein said first wireless device transmits beacons according to IEEE 802.11 standards during operation as said conventional access point (AP) according to IEEE 802.11 standards.

* * * * *